Patented Mar. 8, 1949

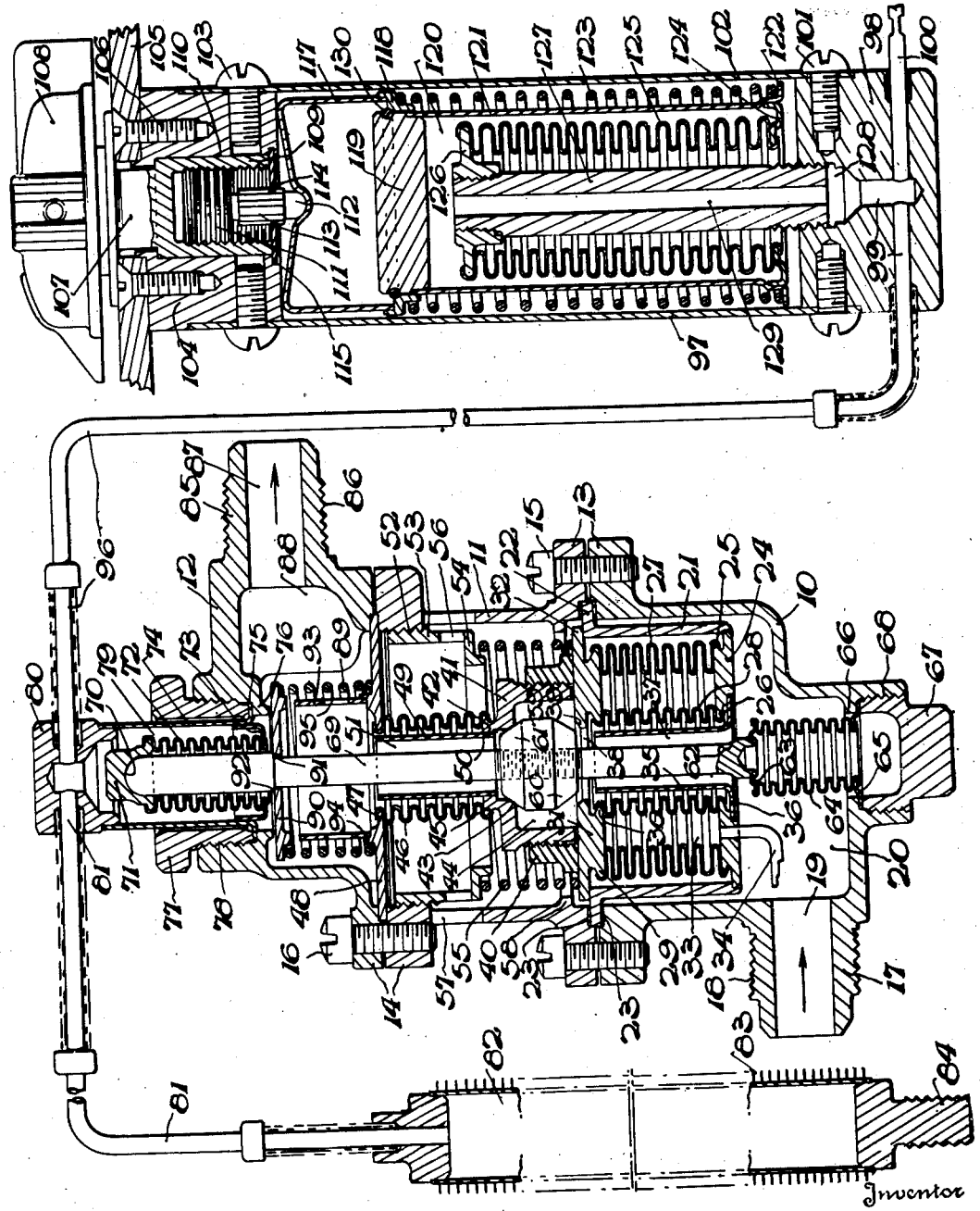

2,463,598

UNITED STATES PATENT OFFICE 2,463,598

TEMPERATURE REGULATOR

William W. Carson, Jr., Knoxville, Tenn., assignor to Robertshaw-Fulton Controls Company, a corporation of Delaware Application March 20, 1947, Serial No. 736,020

7 Claims. (Cl. 236—1)

This invention relates to temperature regulators, and more particularly to a temperature regulator adapted to control automatically the flow of either a heating or a cooling fluid for use with systems wherein the same heat interchange device or devices are used whether a heating medium is circulated into heat interchanging relationship therewith in cold weather or a cooling medium is circulated into heat interchanging relationship therewith during warm weather.

If a single thermostatically operated valve is to control the flow of either a heating fluid or a cooling fluid to maintain a desired temperature condition or range, the operation in response to the thermostat must be reversed depending upon whether a heating fluid or a cooling fluid is being controlled, i. e., if the valve is operating to control a heating fluid, an increase in temperature above the temperature to be maintained requires that the valve be moved toward closed position to decrease the quantity of heating fluid being admitted to the heat interchanger, whereas if the valve is controlling a cooling fluid, an increase in temperature above that which is to be maintained requires a movement of the valve toward open position to increase the amount of cooling fluid flowing to the heat interchanger.

It is an object of this invention to provide an improved temperature regulator of the type characterized wherein a single valve mechanism is automatically conditioned to control the flow of heating or cooling fluid and then thermostatically controlled to automatically regulate the flow of fluid for which the mechanism is conditioned.

Another object of this invention is to provide an improved temperature regulator of the type characterized which is accurately responsive both to the medium to be controlled and to the temperature to be regulated.

Another object of this invention is to provide an improved temperature regulator of the type characterized which is accurately balanced against variations in the pressure of the medium to be controlled.

Another object of this invention is to provide an improved temperature regulator of the type characterized which may be readily and accurately preadjusted to predetermine the temperature condition or range of temperatures to be maintained.

Another object of this invention is to provide an improved temperature regulator of the type characterized which is composed of parts that may be economically fabricated and assembled and which is certain and durable in operation.

Other objects will appear as the description of the invention proceeds.

The invention is capable of receiving a variety of mechanical expressions only one of which is shown on the accompanying drawing, and it is therefore to be expressly understood that the drawing is for purposes of illustration only and is not to be construed as a definition of the limits of the invention, reference being had to the appended claims for that purpose.

The accompanying drawing shows somewhat diagrammatically one embodiment of the present invention.

In the form shown, the main part of the regulator is housed in a casing here illustrated as composed of three sections 10, 11 and 12 provided with suitable flanges 13 and 14 at which the housing sections may be connected together in any suitable way as by a proper number of screws or bolts 15, 16.

Housing section 10 is provided with a nipple 17, shown as threaded at 18 for attachment into any suitable line for conveying to the regulator at different times the heating medium and the cooling medium to be controlled. Nipple 17 is provided with an inlet passage 19 communicating with a chamber 20 within said housing section 10. Disposed in said chamber 20 is a thermostat subjected to the medium to be controlled, and in order that said medium may be brought into intimate contact with said thermostat, the latter is preferably made of annular formation so that in leaving the chamber 20 the medium to be controlled will flow through a passage centrally disposed with respect to the thermostat.

As illustrated, this thermostat is mounted and secured in position between the housing sections 10 and 11. To this end a cylindrical member 21 has a circumferential flange 22 by which said member may be clamped in position between the mating faces of the flanges 13 shown as recessed to receive said flange 22. Gaskets 23 of any suitable material may be interposed between the faces of the flange 22 and the opposed faces of the flanges 13 so as to prevent leakage at this joint. Suitably attached to the opposite end of member 21 is an annular member 24 having oppositely extending flanges 25 and 26 at its inner face. Hermetically sealed to the flange 25 is an expansible and collapsible corrugated tubular wall or bellows 27 and hermetically sealed to the flange 26 is a second and smaller expansible and collapsible corrugated tubular wall or bellows 28 concentrically arranged inside of bellows 27. The opposite ends of said bellows 27 and 28 are hermetically sealed to corresponding flanges 29 and 30 on a second annular member 31 which is also provided with a radially extending flange 32 adapted to engage the flange 22 as a stop means as hereinafter explained. Said bellows 27 and 28, together with the annular member 24 constituting a stationary end wall and the annular member 31 constituting a movable end wall, provide an expansible and collapsible thermostatic chamber 33 which may be charged, as through the filling tube 34, with any suitable thermostatic fluid. The inner bellows 28 provides a centrally arranged passage through which the medium to be controlled can flow in intimate heat interchanging relationship with the chamber 33, but to minimize erosion a tube 35 is preferably mounted by means of a flanged end 36 on the member 24 and thereby provides a centrally arranged passage 37 leading to a centrally arranged opening 38 in the movable end wall 31, said opening 38 constituting a valve port and being formed with a valve seat 39 for a purpose to be explained.

The outer face of member 31 has suitably attached thereto or integrally formed therewith an annular interiorly threaded wall 40, and threadedly received in said wall 40 is an exteriorly threaded cup-shaped member 41 provided with a centrally arranged opening 42 in its bottom wall, said opening constituting a valve port and being formed with a valve seat 43. Members 40 and 41 thereby provide a chamber 44 for the valve member to be described. Member 41 is also provided with a flange 45 and hermetically sealed thereto is an expansible and collapsible corrugated tubular wall or bellows 46 which, at its opposite end, is hermetically sealed to a flange 47 surrounding a central opening in a plate 48, shown as secured in position between the flanges 14 which have their opposing faces preferably recessed to receive the same. Packing similar to 23 may also be used at this joint if desired. Bellows 46 thereby forms a flexibly extensible and contractible conduit between the member 41 and the plate 48 and at the same time provides a passage through which fluid may flow from the chamber 44. However, to minimize erosion, a tube 49 is preferably secured at 50 in the opening 42 to provide the passage 51.

Housing section 11 is interiorly threaded at 52 and adjustably mounted in said interiorly threaded portion is an exteriorly threaded tubular member 53 which has an inwardly directed flange to provide a spring seat at 54. Interposed between said spring seat 54 and the annular member 31 is a coil spring 55. Member 53 has suitable apertures 56, and housing section 11 has suitable apertures 57 so that by introduction of a suitable tool through the latter into engagement with the apertures 56, member 53 may be rotated and by reason of the threads at 52, the spring seat 54 may be moved toward or away from the member 31 to adjust the tension of the spring 55. Spring 55 normally holds the flange 32 in contact with its opposed stop member 22, and to provide a second stop member to limit the movement of the flange 32 away from the stop member 22, housing section 11 is provided with an interiorly projecting rib 58, the spacing between rib 58 and flange 22 predetermining the extent to which the flange 32 may be moved by the annular thermostat heretofore described.

Mounted in the chamber 44 is valve means for cooperation with the valve seats 39 and 43. As here shown, said valve means takes the form of a single valve member 59 provided with oppositely beveled seating surfaces 60 and 61 for cooperation with said seats 39 and 43 although a pair of valve members could be used if preferred. Suitably secured to said valve member 59 as by threading is a composite valve stem. One valve stem section 62 has one end threadedly attached to the valve member 59 and its opposite end secured in any suitable way to the movable end wall 63 of an expansible and collapsible corrugated tubular wall or bellows 64. The opposite end of said bellows 64 is attached in any suitable way to a flange-like member 65 here shown as secured in position against a flange 66 by an exteriorly threaded thimble 67 mounted in an interiorly threaded aperture 68 provided in the wall of the housing section 10. The valve member 59 is of such construction that the effective areas at its two seating portions are equal and they in turn are equal to the effective areas of the bellows 28 and 46 so that there is no unbalance of pressure by reason of the fluid flowing through the passage 37, the chamber 44 and the passage 51. The other valve stem section 69 is threadedly attached to the valve member 59 and has its opposite end 70 in contact with the movable end wall 71 of a second expansible and collapsible corrugated tubular wall or bellows 72, the opposite end of said bellows 72 being hermetically sealed to an interiorly flanged member 73 suitably secured to a tubular wall 74 which at its inner end is flanged at 75 and secured in position against a flange 76 by an annular thimble member 77 which is exteriorly threaded to cooperate with interior threads in an opening 78 provided in the housing section 12. Bellows 72 is of the same effective area as bellows 64 for a purpose to be explained.

Bellows 72 in conjunction with tubular wall 74 and a stationary closure member 80 therefor provide an expansible and collapsible chamber 79 constituting the motor vessel of a second thermostat, said chamber 79 being in communication through a suitable passage in said closure member 80 with any suitable pipe or conduit 81, that may be of any suitable length and size and of rigid or flexible construction, leading to any suitable bulb 82. As here shown bulb 82 is provided with exterior heat conducting fins 83 and at its end a threaded stud 84 by which it may be mounted in any suitable position in the space whose temperature is to be controlled. Bulb 82 and chamber 79, together with their connecting passages, are charged with any suitable thermosensitive fluid, preferably a liquid, so as to provide the desired response to variations in temperature in the space to which the bulb 82 is subjected.

Housing section 12 is provided with a nipple 85 which is exteriorly threaded at 86 for connection into any suitable line leading to the heat interchange device or devices to be used, the outlet passage 87 in nipple 85 communicating with a chamber 88 within the housing section 12 which in turn is in communication with the outlet of the passage 51 through the central opening in plate 48. Mounted in said chamber 88 on the plate 48 is a coil spring 89 which at its opposite end is in engagement with a plate 90 having a central aperture 91 through which the stem 69 extends. Stem 69 outwardly of said plate 90 is provided with a shoulder 92 in engagement with which plate 90 is held by said spring 89. If desired, a tubular member 93 may be suitably secured to an upstanding annular rib 94 on the plate 48 interiorly of the spring 89, said tubular member 93 preferably being provided with apertures 95 for the flow of fluid therethrough.

Also in communication with the passage in closure member 80 is a second pipe or conduit 96 which may be of any suitable length and size and of rigid or flexible construction as preferred, leading to adjustment and overrun mechanism of any suitable character generally indicated at 97. As here shown, said mechanism comprises a block 98 having interior passages 99 in communication with the pipe or conduit 96, and a filling tube 100 may also communicate with said passages. Secured to said block 98 in any suitable way, as by screws 101, is a tubular housing member 102 which at its opposite end is secured in any suitable way, as by screws 103, to a second block 104 adapted to be mounted in any suitable way on any appropriate wall 105, as by screws 106. Extending through an aperture in said wall 105 is the shank 107 of an adjusting knob 108, shank 107 being secured in any suitable way to an interiorly threaded cup-shaped member 109 mounted for rotation in a centrally arranged recess 110 in the block 104. Cooperating with the interior threads on member 109 is a threaded block 111 having a stem 112 which, intermediate its length, is provided with longitudinally extending splines 113 that engage in serrations in the periphery of an aperture 114 in a plate 115 suitably secured in or to the block 104. The splines 113 cooperate with the serrations in aperture 114 to prevent rotational movement of the stem 112 but permit endwise movement of said stem as the block 111 is moved inwardly or outwardly by rotation of the interiorly threaded cup-shaped member 109 from the knob 108.

The inner extremity of stem 112 is engaged with the end wall of a cup-shaped member 117 secured in any suitable way to an annular member 118 providing an annular spring seat. Slidably mounted in said annular member 118 is the end member 119 of a chamber 120 whose outer periphery is formed by a tubular wall 121 secured at one end in any suitable way to member 119 and at its opposite end exteriorly flanged at 122 to provide a second spring seat. A coil spring 123 reacts between said spring seats 118 and 122. Secured to the interior of the tubular wall 121 adjacent the flange 122 is an annular member 124 and hermetically sealed to said member 124 is an expansible and collapsible corrugated tubular wall or bellows 125 which at its opposite end is secured to a flange 126 formed integrally with or formed on a collar threadedly secured to a centrally arranged post 127 here shown as threadedly received in a recess 128 in the block 98 at its opposite extremity. Bellows 125 forms the inner periphery of chamber 120. Post 127 has an interior passage 129 communicating at its opposite extremities with the passages 99 in block 98 and with the chamber 120. End member 119 may move upwardly as viewed in the drawing with respect to the annular member 118, against the tension of the spring 123, compressing the bellows 125, and to limit the extent to which end member 119 may move downwardly as viewed in the drawing under the action of the spring 123, said end member 119 is provided with suitable stop means for cooperation with the annular member 118, here shown as a ring 130 carried by the end member and engageable with a seat or shoulder on the annular member 118. Chamber 120, passages 129 and 99, and piping 96 are filled wtih the same fluid as used in the charge of the thermostat 82, 81, 79.

In operation the bulb 82 is mounted in any suitable way as by the threaded stud 84, so as to be subjected to the temperature to be controlled, while the source of the medium to be controlled is connected to the inlet 19 of the regulator, and the heat interchanging device or devices to be utilized are connected to the outlet 87 of said regulator. Assuming that the inlet 19 is in communication with a source of heating medium, the heating medium enters chamber 20 through inlet 19 and may flow through the passage 37 axially disposed with respect to the thermostat 33, the chamber 44 containing the valve member 59, the passage 51 and the chamber 88 to outlet 87. The heating medium being at an elevated temperature the thermostat 33 is expanded thereby, moving the movable end wall 31 upwardly as viewed in the drawing until it engages the stop afforded by the rib 58. Thereby the valve seat 39 is brought into cooperative relationship with the face 60 of the valve member 59, so that upon a rise in the temperature to which the bulb 82 is subjected above that to be maintained the resultant expansion of the thermostat composed of bulb 82, tubing 81 and motor vessel 79 causes the valve member 59 to move toward its seat 39 to diminish the flow of heating medium past the valve member 59, as is proper when a heating medium is to be controlled. Conversely, a drop in the temperature to which the bulb 82 is subjected below that to be maintained results in a contraction of the thermostat 82, 81, 79, thereby moving the valve face 60 away from the port 39 to increase the flow of heating medium. The temperature at which the thermostat 33 responds to move the seat 39 into cooperative relationship with the valve member 59 can be predetermined by rotating the cup-shaped member 53 on its threads 52 toward or away from the movable end wall 31 to predetermine the tension of the spring 55 and thereby the temperature required to effect expansion of the thermostat 33.

When a source of cooling medium is connected to the inlet 19 the flow of cooling medium is the same as just described, but the cooling medium being at a reduced temperature the thermostat 33 is contracted and its flange 32 is held in engagement with the flange 22 by the spring 55. In this relationship, the valve port 43 is in cooperative relationship with the face 61 of valve member 59, so that upon an increase in the temperature of the space to which the bulb 82 is subjected above that to be maintained the thermostat 82, 81, 79 will expand to move the valve member 59 away from the port 43, thereby increasing the flow of cooling medium past the valve member 59, as is proper for a rise of temperature at bulb 82 when a cooling medium is to be controlled. Conversely a decrease in temperature at the bulb 82 below that to be maintained results in valve member 59 moving toward seat 43.

In either event, the control as so far described is independent of any variations in pressure that may exist in the medium to be controlled, whether heating medium or cooling medium, because the bellows 72 and 64 have the same effective area and act in opposition on the composite valve stem 62, 69, so that the pressure of the medium to be controlled thereby acts equally and in opposite directions on the valve member 59. Similarly, the valve seats 39 and 43 are of equal effective area as are also the seating surfaces 60 and 61. Also the bellows 46 and 28 are of the same effective area. Hence the pressure of the medium to be controlled applies balanced forces throughout so as to avoid changes in the operation of the regulator due to different or fluctuating pressures in said medium.

The temperature to be maintained in the space to which the bulb 82 is subjected may be predeterminately adjusted by manipulation of the knob 108 to move the cup-shaped member 117 through the operation of the threaded plug 111 and the post 112. During such adjustment the spring 123 operating between the seats 118 and 122 causes the cylinder 121 and the head 119 to move with the member 118, to which cup-shaped member 117 is attached, as a unit, the bellows 125 expanding or contacting to vary the volume of the chamber 120. Depending upon whether the end member 119 is moved toward or away from the end of the post 127 the fluid with which the system is charged is forced out of the chamber 120 into the motor vessel 79 or withdrawn into chamber 120 from the motor vessel 79, respectively causing the motor vessel 79 to expand or contract. When a heating medium is being controlled, expansion of vessel 79 moves valve member 59 toward port 39 so that a lower rise of temperature at the bulb 82 will effect the closing of the port 39, while contraction of vessel 79 moves the valve member 59 farther away from the port 39 so that a higher temperature is required at the bulb 82 to effect the closure of the port 39. When a cooling medium is to be controlled expansion or contraction of vessel 79 respectively causes the valve member 59 to move farther away from or closer to its port 43 so that a lower or a higher temperature at the bulb 82 is required respectively to effect the closure of the port 43.

If under any condition of operation the temperature of the thermostatic fluid continues to increase after the valve member 59 has become seated, a further increase of pressure in the chamber 120 will cause end member 119 to move away from flange member 118 against the tension of the spring 123, with a corresponding contraction of the bellows 125, so that a pressure cannot develop in the motor vessel 79 sufficient to cause injury to the bellows 72. As soon as the excess pressure is relieved, however, spring 123 restores the end member 119 to the position illustrated in the drawing, and chamber 120 can again be expanded or contracted by manipulation of the knob 108 so as to predetermine the temperature to be maintained by the regulator as heretofore described.

Owing to the shoulder 92 on valve stem 69 and its engagement with plate 90, downward movement of the valve member 59 owing to expansion of the motor vessel 79 is opposed by the tension of the spring 89 whereby, upon contraction of said motor vessel 79, the valve stem 69 is moved upwardly as viewed in the drawing to retain its end 70 in contact with the end wall 71 of the motor vessel 79. Thereby any danger that the valve member may stick to its valve seat and the vessel 79 move its end wall 71 out of engagement with the end of the valve stem 69 is obviated.

It will therefore be perceived that by the present invention a single thermostatically operated valve has been provided for automatically controlling the flow of either a heating fluid or a cooling fluid, depending upon what character of fluid is introduced into the conduit communicating with the regulator inlet 19, whereby a desired temperature condition or range of temperatures may be accurately maintained in the space whose temperature is to be controlled by utilizing the same valve member to control the medium flow in conformity with the variations in the temperature in said space and also to establish that relationship of the valve means to its ports which is proper for the particular medium whose flow is to be controlled. The regulating mechanism is certain and efficient in operation, balanced against fluctuations or variations in the pressure of the medium being controlled, readily adjustable to set the temperature condition or range of temperatures to be maintained, and composed of parts which are inexpensive to fabricate and assemble.

While the embodiment of the invention illustrated on the drawing has been described with considerable particularity it is to be expressly understood that the invention is not limited thereto, as other embodiments of the invention will now readily suggest themselves to those skilled in the art, and changes may also be made in the details of construction, arrangement, proportion, size, etc., of the component parts, without departing from the spirit of this invention. Reference is therefore to be had to the claims hereto appended for a definition of said invention.

What is claimed is:

1. In a temperature regulator for automatically controlling the flow of either a heating medium or a cooling medium, in combination with a housing having an inlet and an outlet, valve means provided with a pair of seating surfaces, means provided with a pair of valve ports adapted to cooperate with said seating surfaces respectively, a thermostat operatively connected to said last named means and subjected to the temperature of the medium flowing through said housing to move said last named means so that one or the other of said valve ports is positioned in cooperative relationship with one or the other of said seating surfaces depending upon whether said medium is hot or cold, a second thermostat including an expansible and collapsible chamber operatively connected to said same valve means for adjusting the same to vary the flow of medium between the operative seating surface thereon and the valve port positioned in cooperative relationship therewith, said expansible and collapsible chamber subjected to the pressure of the medium flowing through said housing, and pressure responsive means operatively connected to said valve means for balancing the pressure of said medium on said expansible and collapsible chamber.

2. In a temperature regulator for automatically controlling the flow of either a heating medium or a cooling medium, in combination with a housing having an inlet and an outlet, valve means provided with a pair of seating surfaces, means provided with a pair of valve ports adapted to cooperate with said seating surfaces respectively, a thermostat operatively connected to said last named means and subjected to the temperature of the medium flowing through said housing to move said last named means so that one or the other of said valve ports is positioned in cooperative relationship with one or the other of said seating surfaces depending upon whether said medium is hot or cold, a thermostat including a motor vessel in said housing, a stem operatively connected to said motor vessel and valve means for adjusting the same to vary the flow of medium between the operative seating surface thereon and the valve port in cooperative relationship therewith, and means in said housing coacting with said valve stem in opposition to said motor vessel for balancing the pressure of said medium on said motor vessel.

3. In a temperature regulator for automatically controlling the flow of either a heating medium or a cooling medium, in combination with a housing having an inlet and an outlet, a thermostat subjected to the medium flowing through said housing, said thermostat including a cup-shaped supporting member mounted in said housing and having an aperture in its bottom wall, a pair of concentric expansible and collapsible tubular walls hermetically sealed to the bottom of said cup-shaped member around said aperture to provide a centrally arranged passage and an intermediate expansible and collapsible chamber, and a movable end wall hermetically sealed to said expansible and collapsible walls and having a valve port communicating with said passage, means cooperating with said movable end wall to limit the range of movement thereof, means carried by said movable end wall and providing a chamber having a valve port opposed to said first named port, valve means in said chamber provided with a pair of seating surfaces respectively aligned with said valve ports, said thermostat being operable by expansion or contraction to move one or the other of said valve ports into cooperative relationship with said valve means, and a second thermostat responsive to the temperature of the space to be controlled operatively connected to the same valve means for adjustably controlling the flow of medium between the seating surface and valve port positioned in cooperative relationship.

4. In a temperature regulator for automatically controlling the flow of either a heating medium or a cooling medium, in combination with a housing having an inlet and an outlet, a thermostat subjected to the medium flowing through said housing and having a movable end wall, means carried by said movable end wall and providing a chamber having a pair of valve ports, valve means in said chamber provided with a pair of seating surfaces respectively aligned with said valve ports, said thermostat being operable by expansion or contraction to move one or the other of said valve ports into cooperative relationship with said valve means, means for predetermining the location of said movable end wall depending upon whether hot or cold medium is flowing into heat interchanging relationship with said thermostat, a thermostat adapted to be subjected to the temperature to be controlled and operatively connected to the same valve means for adjustably controlling the flow of medium between the seating surface and valve port positioned in cooperative relationship, resilient means cooperating with the movable end wall of said first named thermostat for normally retaining one of said valve ports and said valve means in such relationship that expansion of said second named thermostat moves a seating surface on said valve means away from its cooperating port, and means for adjusting the tension of said resilient means to predetermine the temperature at which said first named thermostat will move said valve ports into that position in which expansion of said second named thermostat moves a seating surface on said valve means toward its cooperating valve port, said adjusting means including a threadedly mounted sleeve providing an abutment for said resilient means and having provisions accessible from the exterior of said housing for rotating said sleeve.

5. In a temperature regulator for automatically controlling the flow of either a heating medium or a cooling medium, in combination with a housing having an inlet and an outlet, a thermostat subjected to the medium flowing through said housing and having a movable end wall, means carried by said movable end wall and providing a chamber having a pair of valve ports, valve means in said chamber provided with a pair of seating surfaces respectively aligned with said valve ports, said thermostat being operable by expansion or contraction to move one or the other of said valve ports into cooperative relationship with said valve means, a second thermostat responsive to the temperature of the space to be controlled operatively connected to the same valve means for adjustably controlling the flow of medium between the seating surface and valve port positioned in cooperative relationship, said first named thermostat including an annular expansible and collapsible corrugated chamber providing a centrally arranged extensible and contractible passage leading to one of said ports and through which all of the medium flowing to said valve-containing chamber must flow into heat interchanging relationship with said first named thermostat, and a second extensible and contractible passage leading from the other of said ports and through which flows the medium flowing from said valve-containing chamber.

6. In a temperature regulator for automatically controlling the flow of either a heating medium or a cooling medium, in combination with a housing having an inlet and an outlet, a thermostat subjected to the medium flowing through said housing and having a movable end wall, means carried by said movable end wall and providing a chamber having a pair of valve ports, valve means in said chamber provided with a pair of seating surfaces respectively aligned with said valve ports, said thermostat being operable by expansion or contraction to move one or the other of said valve ports into cooperative relationship with said valve means, a second thermostat responsive to the temperature of the space to be controlled including a motor vessel in said housing and a stem operatively connecting said motor vessel to said valve means for adjustably controlling the flow of medium between the seating surface and valve port in cooperative relationship, and pressure responsive means operatively connected to said stem in opposition to said motor vessel and having the same effective area as said motor vessel for balancing the pressure on said valve means.

7. In a temperature regulator for automatically controlling the flow of either a heating medium or a cooling medium, in combination with a housing having an inlet and an outlet, a thermostat subjected to the medium flowing through said housing and having a movable end wall, means carried by said movable end wall and providing a chamber having a pair of valve ports, valve means in said chamber provided with a pair of seating surfaces respectively aligned with said valve ports, said thermostat being operable by expansion or contraction to move one or the other of said valve ports into cooperative relationship with said valve means, a second thermostat responsive to the temperature of the space to be controlled and operatively connected to said valve means for adjustably controlling the flow of medium between the heating surface and valve port in cooperative reltaionship, said first named thermostat including a pair of concentrically arranged bellows with the inner bellows forming a conduit to one of said valve ports, and a bellows forming a conduit communicating with the other of said valve ports, said two last named bellows flexing to permit movement of said movable end wall to one or the other of its positions of adjustment and having equal effective areas to maintain a balanced pressure thereon.

WILLIAM W. CARSON, Jr.

REFERENCES CITED

The following references are of record in the file of this patent:

UNITED STATES PATENTS

| Number | Name | Date |
| --- | --- | --- |
| Re. 22,685 | Carrier | Oct. 30, 1945 |
| 2,353,889 | Giesler | July 18, 1944 |